United States Patent

Mazer

[11] Patent Number: 5,819,071
[45] Date of Patent: Oct. 6, 1998

[54] REMOTE SIMULATION OF DATA TRANSMISSION

[75] Inventor: Alan S. Mazer, Pasadena, Calif.

[73] Assignee: Jet Propulsion Laboratory, Pasadena, Calif.

[21] Appl. No.: 644,614

[22] Filed: May 1, 1996

[51] Int. Cl.[6] .................................................. G06F 9/455
[52] U.S. Cl. .............. 395/500; 395/185.02; 395/200.09; 395/920; 379/104
[58] Field of Search ..................... 395/500, 575, 395/800, 200.32, 200.54, 185.02, 200.09; 371/16; 381/36; 379/100, 96, 207, 104; 380/18; 370/94

[56] References Cited

U.S. PATENT DOCUMENTS

| | | | |
|---|---|---|---|
| 4,456,994 | 6/1984 | Segarra | 371/16 |
| 4,611,342 | 9/1986 | Miller et al. | 381/36 |
| 4,918,722 | 4/1990 | Duehren et al. | 379/100 |
| 5,166,977 | 11/1992 | Ross | 380/18 |
| 5,200,993 | 4/1993 | Wheeler et al. | 379/96 |
| 5,299,197 | 3/1994 | Schlafly | 370/94 |
| 5,333,286 | 7/1994 | Weinberger et al. | 395/575 |
| 5,481,601 | 1/1996 | Nazif et al. | 379/207 |
| 5,502,653 | 3/1996 | Lewis | 364/514 B |
| 5,524,253 | 6/1996 | Pham et al. | 395/800 |

OTHER PUBLICATIONS

"A Simulation Model for Performance Evaluation of ISDN User Part Basic Call Control Procedures", by Sastry et al., IEEE Milcom '90: A New Era, Jun. 1990, pp. 0051–0057.

"Transmission of Digital HDTV Through the NASA Communications Network", by Beakley et al., Globecom '92: IEEE Global Telecommunications Conference, Feb. 1992, pp. 1093–1097.

"Error Correction using IFMV9 Coded Overlapped PN Sequence for Power Line SSMA", by Tsuzuki et al., IEEE Spread Spectrum Techniques and Applications, 1994 Symposium, May 1994, pp. 258–262.

*Primary Examiner*—Kevin J. Teska
*Assistant Examiner*—Russell W. Frejd
*Attorney, Agent, or Firm*—Fish & Richardson P.C.

[57] ABSTRACT

A user machine simulates data transmission by remotely accessing and starting up a remote machine, and communicating the data transmission method to be simulated to the remote machine. The remote machine simulates the data transmission and returns simulation results to the user machine.

28 Claims, 13 Drawing Sheets

```
#include
#include
#include
#include
#include
#include
#include
#include "jpeg.h"
#include "rice.h"
```

/* This is the JPEG glue function for the first phase of compression
   the DCT. Glue functions for the quantization and Huffman encoding
   follow. */

```
int jpeg_dct_glue(int context,void **args,void **arg_descrs)
{
   u_char_2d image;
   int MCU_rows_in_scan,MCUs_per_row,elapsed_time;
   static float_2d dcts;
   static char elapsed_time_ascii[30],*p = elapsed_time_ascii;
   int status;

/* if initializing, clear pointers. */ if (context == RUN_TIME_INIT) dcts.data = NULL;

/* if executing, do it ... */ else if (context == EXECUTE) {

/* get the input parameters, here just an image. */
```

FIG. 11A

```
input_u_char_2d(args,arg_descrs,0,&image);

/* calculate stuff required for DCT routine and begin
       to fill in the dcts output argument. */

MCU_rows_in_scan = (image.height+DCTSIZE-1) / DCTSIZE;
    MCUs_per_row = (image.width+DCTSIZE-1) / DCTSIZE;
    elapsed_time = 0;
    dcts.height = (image.height + DCTSIZE - 1) / DCTSIZE * DCTSIZE;
    dcts.width = (image.width + DCTSIZE - 1) / DCTSIZE * DCTSIZE;

/* call DCT routine and get DCTs.  return immediately on error. */ status = jpeg_dct(image.height, image.width,&elapsed_time,
        MCU_rows_in_scan,MCUs_per_row,image.data,&dcts.data);
    if (status == -1) return(-1);

/* write integer elapsed time out to char buffer so that we can
         tack on " ms" suffix and then output elapsed time string and
         newly computed DCTs. */

(void)sprintf(elapsed_time_ascii,"%d ms",elapsed time);
    output_string(args,arg_descrs,1,&p);
    output_float_2d(args,arg_descrs,2,&dcts);
}

/* if cleanup, free allocated memory, if any. */ else if (context == POSTRUN_CLEANUP)
    if (dcts.data) (void)free(dcts.data);
return(0);
}
```

FIG. 11B

REMOTE SIMULATION OF DATA TRANSMISSION

ORIGIN OF THE INVENTION

The invention described herein was made in the performance of work under a NASA contract, and is subject to the provisions of Public Law 96-517 (35 U.S.C. §202) in which the Contractor has elected to retain title.

FIELD OF THE INVENTION

This invention relates to accessing and executing data transmission simulations on remote machines.

BACKGROUND OF THE INVENTION

Data transmission typically includes a number of steps, in addition to the actual transmission. Such steps may include encoding and compressing the original data, and selecting a transmission channel over which to send the processed data. At the receiving end, corresponding steps may include receiving the data over the channel, and attempting to reconstruct the original data from the receive data through decompression and decoding.

However, reconstructed data often contains errors introduced during the transmission. Such errors frequently result from noise in the channel, which induces errors into the transmission. The effect of the noise depends on the specific transmission processes used in encoding and compressing the data.

Accordingly, data transmission processes are tested through simulations to ensure robustness in the various applications for which they are intended. This testing can be very expensive and often is not sufficient to ensure reliability.

One reason is that software and/or hardware designed by different developers often cannot be readily combined, especially without an intimate familiarity with the components. The resulting diversity of transmission software and hardware makes it more difficult for end users wanting to install a data transmission scheme to test a variety of transmission methods.

Another difficulty arises from transmission software that will run properly only on specific machines. For example, if the code is written for use with a particular digital signal processor ("DSP"), it may run only on machines having the processing capabilities of that DSP. Simulating or accessing a variety of machines to run different transmission programs for sufficient testing is not feasible for most end users.

The problem becomes worse for computers and/or software that have become obsoleted by technology. Many such software programs cannot be run on any platform except the host for which they were intended. Those hosts, moreover, may be rare.

Accordingly, the inventors of the present invention recognized a need to enable a user at a single machine to simulate a variety of data transmission processes, without requiring a detailed understanding of the implementing code or access to a variety of machine types.

The present invention addresses this need by enabling a user from a single user machine to run data transmission simulation software on remote systems, which may be of a variety of machine types. Accordingly, in one aspect, the invention provides a computer-implemented method for a user machine to simulate a data transmission on a remote machine, by determining a method for data transmission to be simulated, determining a remote machine on which to simulate the data transmission, establishing a connection to the remote machine, instructing the remote machine to simulate the determined method of data transmission, and receiving results of the simulated data transmission from the remote machine.

The remote machine may be determined by any appropriate manner. For example, a user may input information designating a specific remote machine. Alternatively, the remote machine may be determined by the determined method of data transmission.

In a preferred embodiment, the data transmission is simulated by executing machine-dependent program code on a compatible machine. While the remote machine is compatible with that machine-dependent program code, the user machine need not be compatible with the machine-dependent program code.

The present invention also includes a number of additional features, such as enabling the transmission simulation to simulate transmission over a designated channel, wherein the simulation also includes injecting noise characteristic of the designated channel. Another possible feature is determining an estimated transmission error rate based on the simulation results.

In another aspect, the present invention provides a computer program stored on a machine-readable media for enabling a user machine to simulate a data transmission on a remote machine. The computer program configures the user machine upon being read by the user machine to determine a method for data transmission to be simulated, determine a remote machine on which to simulate the data transmission, establish a connection to the remote machine, instruct the remote machine to simulate the determined method of data transmission, and receive results of the simulated data transmission from the remote machine.

Yet another aspect of the present invention provides a computer system for simulating a data transmission. Such a computer system includes a user machine for determining a data transmission technique to be simulated, and for communicating the determined data transmission technique to a remote machine, and a set of remote machines, each connected to the user machine. At least one of the set of remote machines receives communication from the user machine indicating the determined data transmission technique, simulates the determined method of data transmission, and communicates simulation results to the user machine.

In this embodiment, the data transmission technique to be simulated may include multiple steps, each of which may be simulated on a different one of the set of remote machines.

The present invention has a number of advantages. For example, by enabling processing on remote machines, the present invention can take advantage of parallel processing to decrease the processing time required for a particular simulation. Similarly, the processing time can also be decreased by enabling the user to execute the simulation on a remote machine having greater processing power than the user machine.

The present invention also enables simulation of a variety of data transmission processes implemented by program code that requires specific machine types. For example, the remote processing capabilities provided by the present invention enable a user, from a user machine, to run a particular program written in a language that will run only on a machine type different from that of the user machine, or which requires a machine type having special processing capabilities not supported by the user machine.

For a fuller understanding of the nature and further advantages of the invention, reference should be made to the detailed description taken in conjunction with the accompanying drawings.

BRIEF DESCRIPTION OF THE DRAWINGS

The accompanying drawings, which are incorporated in and constitute a part of the specification, schematically illustrate specific embodiments of the invention and, together with the general description given above and the detailed description that follows, serve to explain the principles of the invention.

FIG. 11 shows program code for implementing a glue function provided by one embodiment of the present invention.

DESCRIPTION OF THE PREFERRED EMBODIMENT

The preferred embodiment describes a system for simulating data transmission, although the invention may readily be applied to other fields in which processing on remote machines may be desirable.

As will be described in greater detail below, the present invention enables a user at a user machine to simulate a variety of transmission methods by executing the simulation on remote machines accessible over a network, and receiving the results of the transmission simulation. The specific format and content of the results will vary depending on the needs for the application, and may include data such as test data prior to simulated transmission, test data after simulated transmission, and estimated transmission error rates.

As used herein, simulation of a data transmission method entails applying processes that would affect data being transmitted by that method. As earlier mentioned, data transmission can involve many steps, including conversion, encryption and decryption, compression and decompression, and channel selection, in addition to the actual transmission. Each of these steps, in turn, can be implemented by numerous methods. The present invention may simulate a variety of such steps and implementation methods. However, to aid in the understanding of the invention, the following description will focus primarily on an embodiment simulating a data transmission scheme including the basic steps of compression, transmission, and decompression.

One embodiment of the present invention is implemented with an expandable set of software modules, collectively referred to as Advanced End-to-end Simulation for On-board Processing modules ("AESOP modules"). AESOP modules enable a user machine to manipulate machine-dependent code by surrounding the code with machine-independent packeting, making any specific machine requirements of the underlying code transparent to the user machine. The AESOP software was developed by the Jet Propulsion Laboratory ("JPL") of the California Institute of Technology, and has been documented in the JPL web page accessible on the Internet at http://www-ias.jpl.nasa.gov/aesop/aesop.html.

When a particular block of machine-dependent code is to be executed, the AESOP software determines any specific machine requirements, and if necessary, logs in at a remote machine capable of executing the code. Thus, the present invention allows a user to test a variety of data transmission processes, regardless of the machine-dependency of the implementing software.

I. A User Perspective

A description of a user's perspective of one embodiment of the present invention, with reference to the drawings, may help to provide a better understanding. In this embodiment, a graphical user interface ("GUI") provides a menu bar allowing the user to select options, and displays the steps of the simulated data transmission as a series of boxes in a flow diagram.

Figure 1:
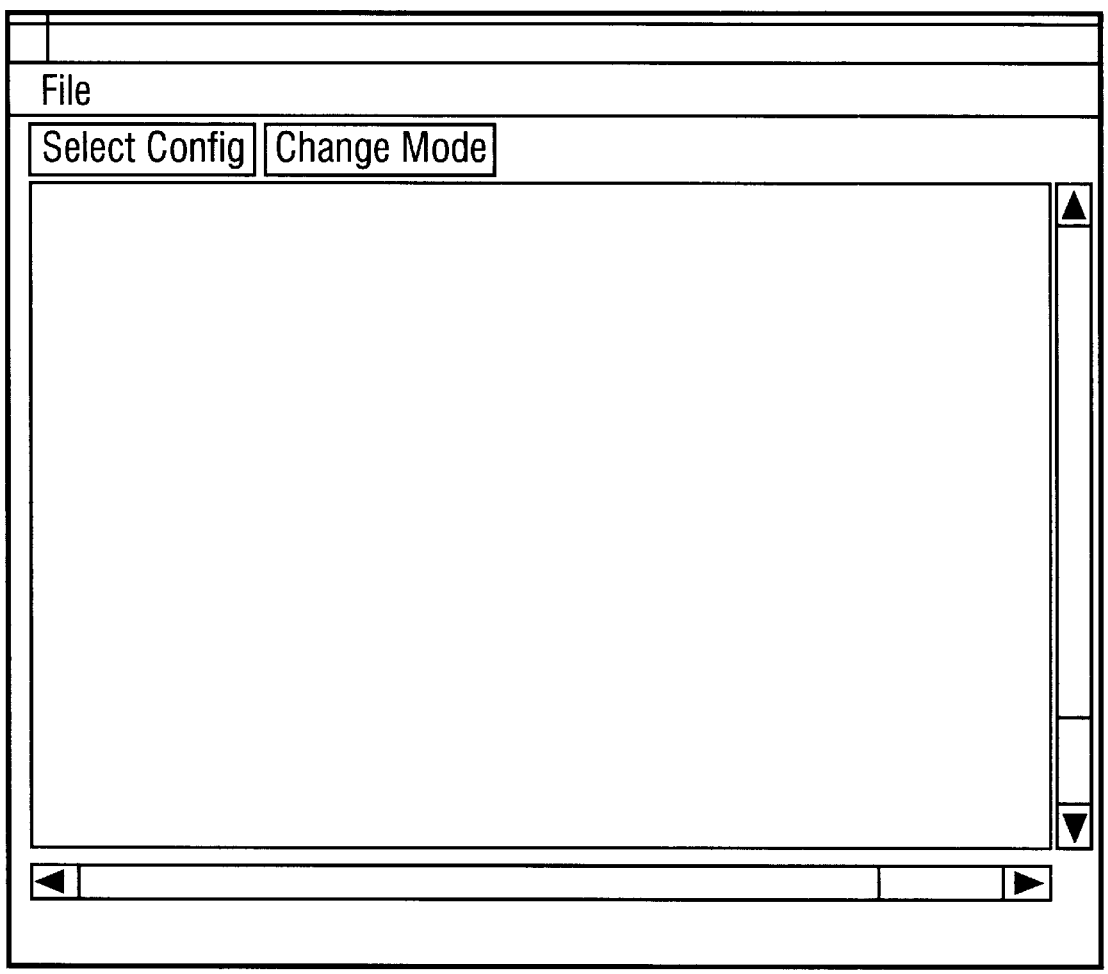
FIG. 1 shows a screen display presented by an embodiment of the present invention.

FIG. 1 shows an initial AESOP screen. The "File" menu entry provides the accustomed file management functions, such as save and exit. As explained in greater detail below, the term "config" or configuration refers to a complete application program. Accordingly, the "Select Config" menu entry allows the user to select an application program to run. The "Change Mode" menu entry allows the user to switch between modes. Various modes can be provided. This embodiment includes an automatic mode for running the simulation straight through and a debugging mode for running the simulation one step at a time, allowing the user to view various parameters at each step.

Figure 2:
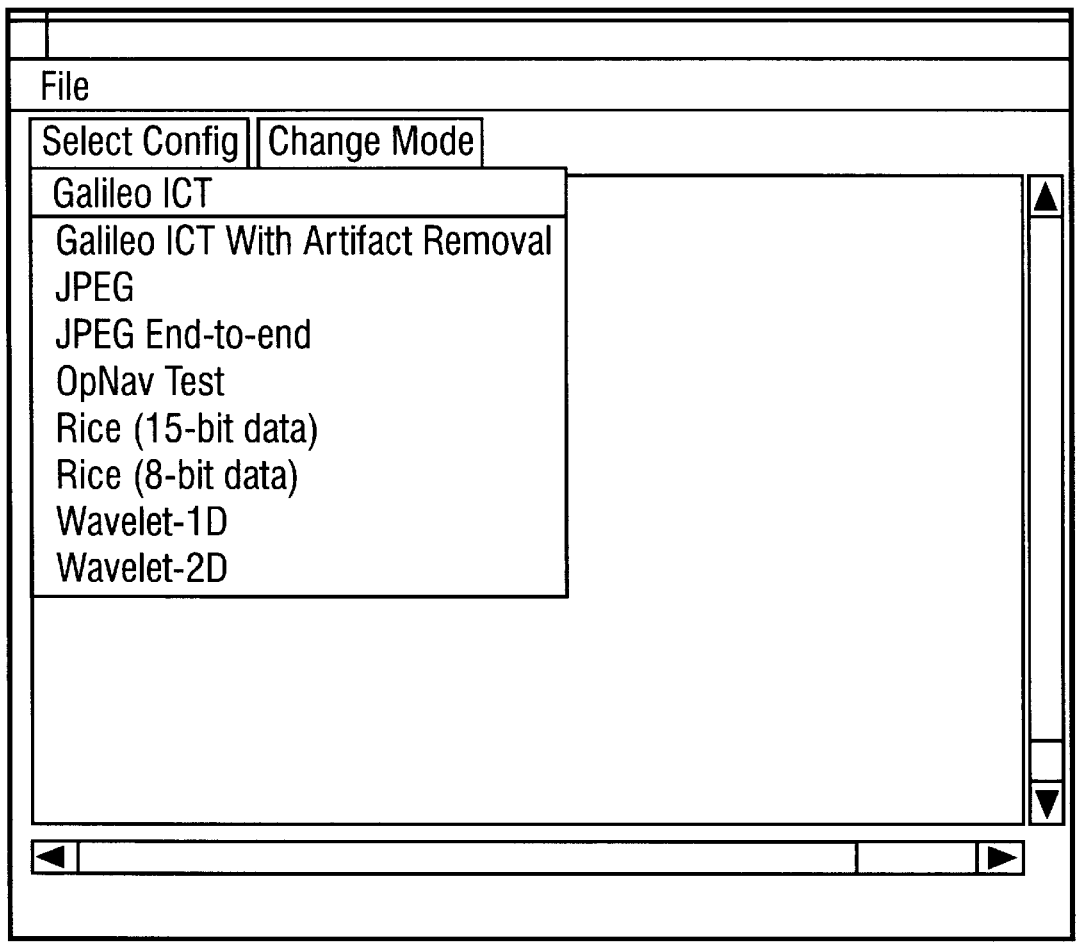
FIG. 2 shows a screen display presented by an embodiment of the present invention listing configuration options.

The GUI of this embodiment provides pull-down menus to list current available options to the user. For example, FIG. 2 illustrates a possible screen display after the user has selected "Select Config," with the pull-down menu listing the range of available configurations. The illustrative configurations listed in FIG. 2 refer to various transmission programs.

Figure 3:
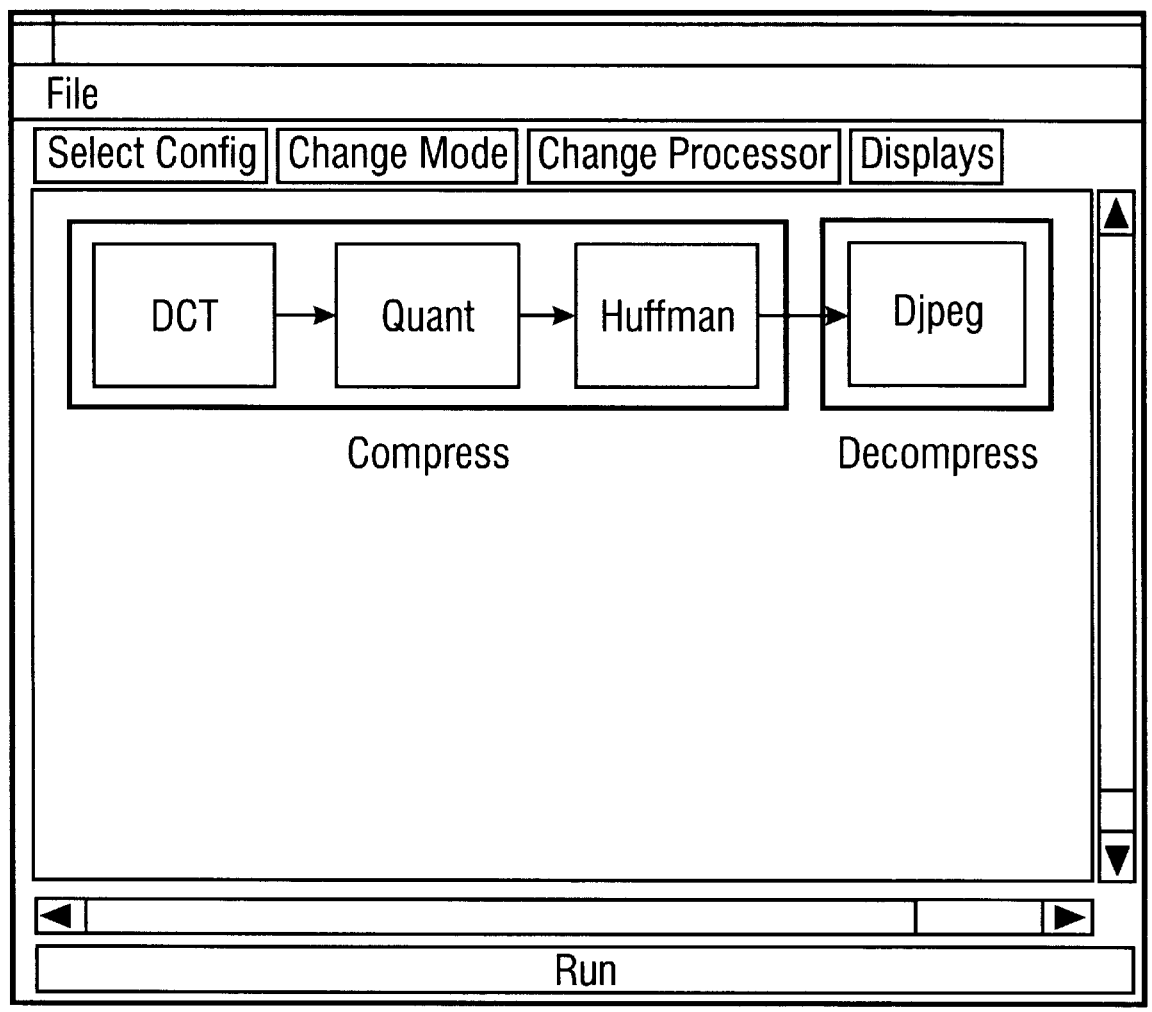
FIG. 3 shows a screen display presented by an embodiment of the present invention providing a flow diagram of a particular configuration.

Once the user selects a configuration, the GUI of this embodiment generates and displays a flow diagram, illustrating steps of the selected configuration. FIG. 3 shows such a flow diagram resulting from a user's selection of the "JPEG" configuration. JPEG is a known compression technique, and those of ordinary skill in the art will recognize that the present invention may be practiced with numerous other compression formats, such as GIF, vectorization schemes, or other such systems.

In this example, the JPEG configuration steps are classified into two primary groups, Compress and Decompress. As shown, the Compress group includes the steps for DCT ("discrete cosine transform"), quantization, and Huffman coding, and the Decompress group includes the single step of JPEG decompression.

FIG. 3 also shows that this embodiment displays new menu options available to a user once a configuration is selected. Those skilled in the art will recognize that the specific options provided may vary as needed. In this case, the options include: (1) Change Processor, to manually indicate a specific machine on which to run a step of the configuration; (2) Displays, to customize the display; and (3) Run, to begin execution.

Pop-up windows are used within the flow diagram to indicate additional parameters which may be set by the user.

Figure 4:
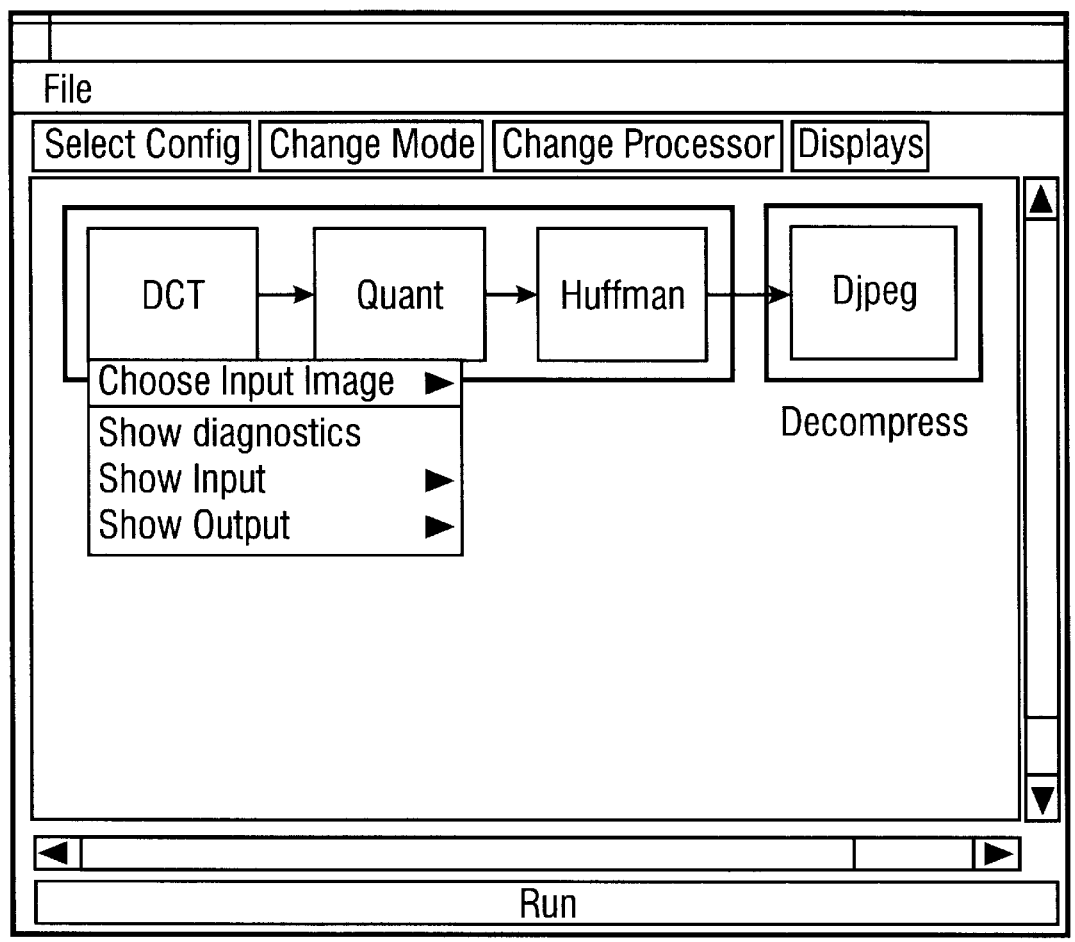
FIG. 4 shows a pop-up window presented in a screen display of the present invention, indicating parameters which may be set by a user.
Figure 5:
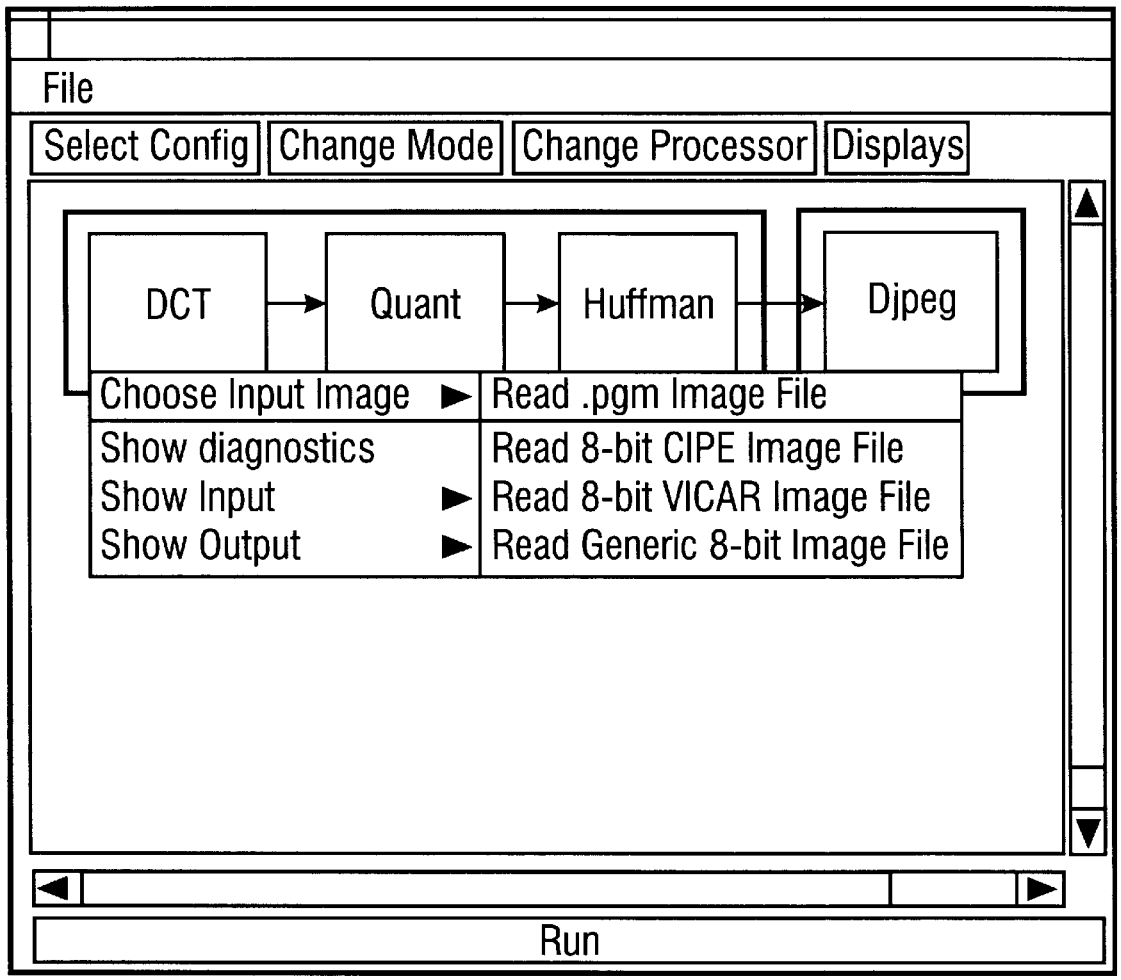
FIGS. 5–10 show further options presented in accordance with one embodiment of the present invention.
Figure 6:
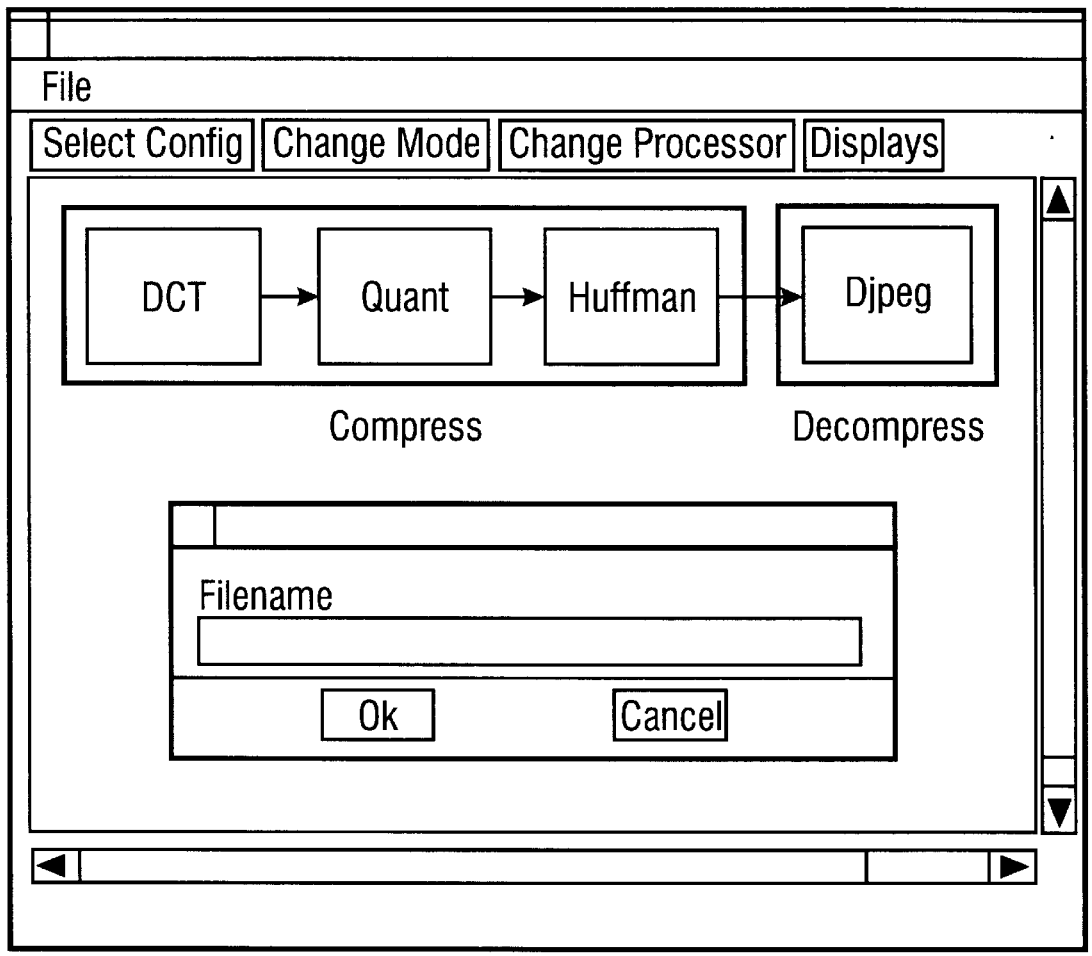

FIG. 4 shows, for example, that for the DCT step, the user can "Choose Input Image." Clicking on this option expands the pop-up window to display a list of appropriate input file types, as shown in FIG. 5, and after selecting an input file type, a further pop-up window, shown in FIG. 6, is displayed for the user to input the filename.

Figure 7:
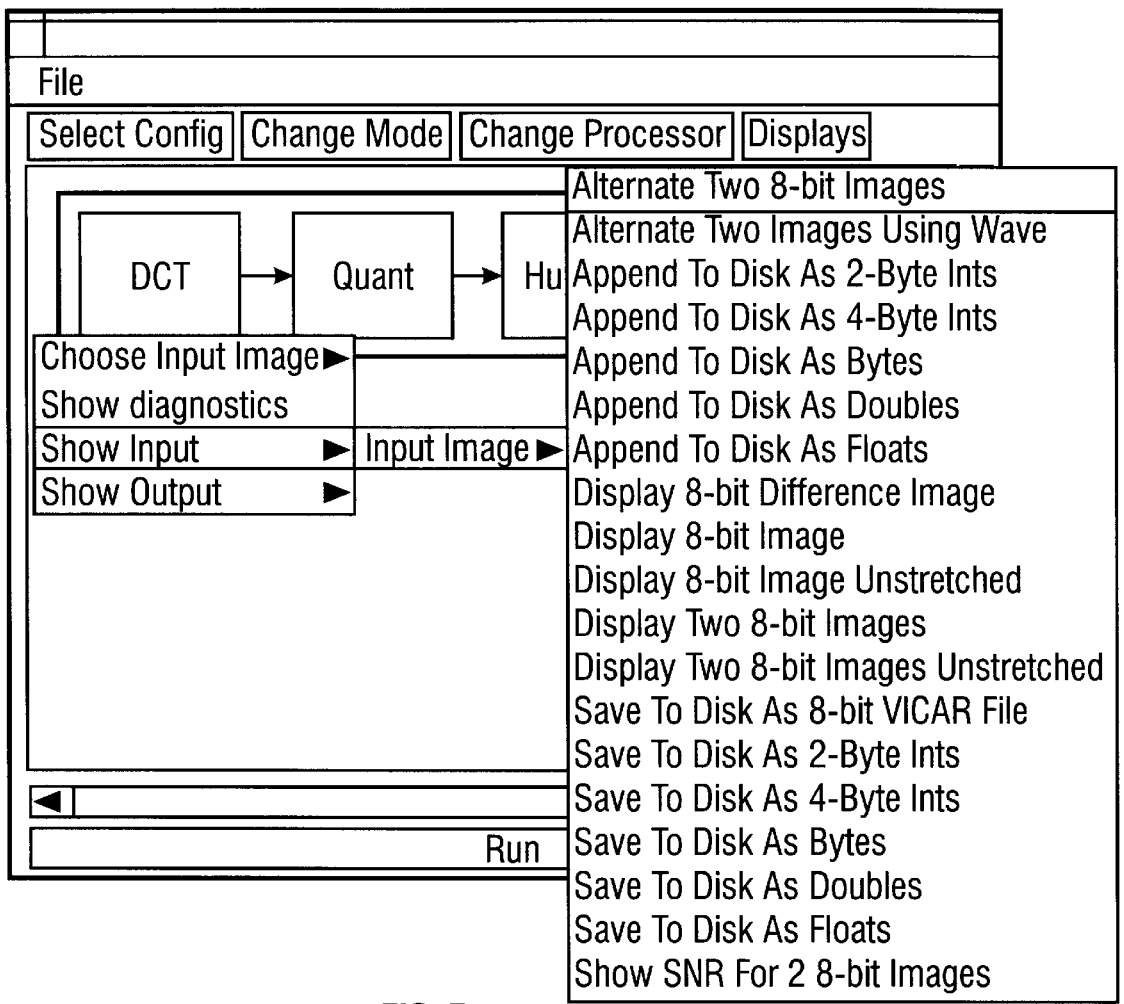

Also for the DCT step, this embodiment provides the user the options for displaying the input data, as indicated by the "Show Input" option, shown in expanded form in FIG. 7. These types of options can be provided where appropriate at steps throughout each configuration.

By clicking on the "Displays" menu option, the user can customize the display. This embodiment provides, for example, options for displaying the original data, as input into the configuration, reconstructed data, as output from the configuration, and an elapsed time count required for each step. One skilled in the art will recognize that the specific displays supported by the invention may be varied in accordance with the specific application.

Figure 8:
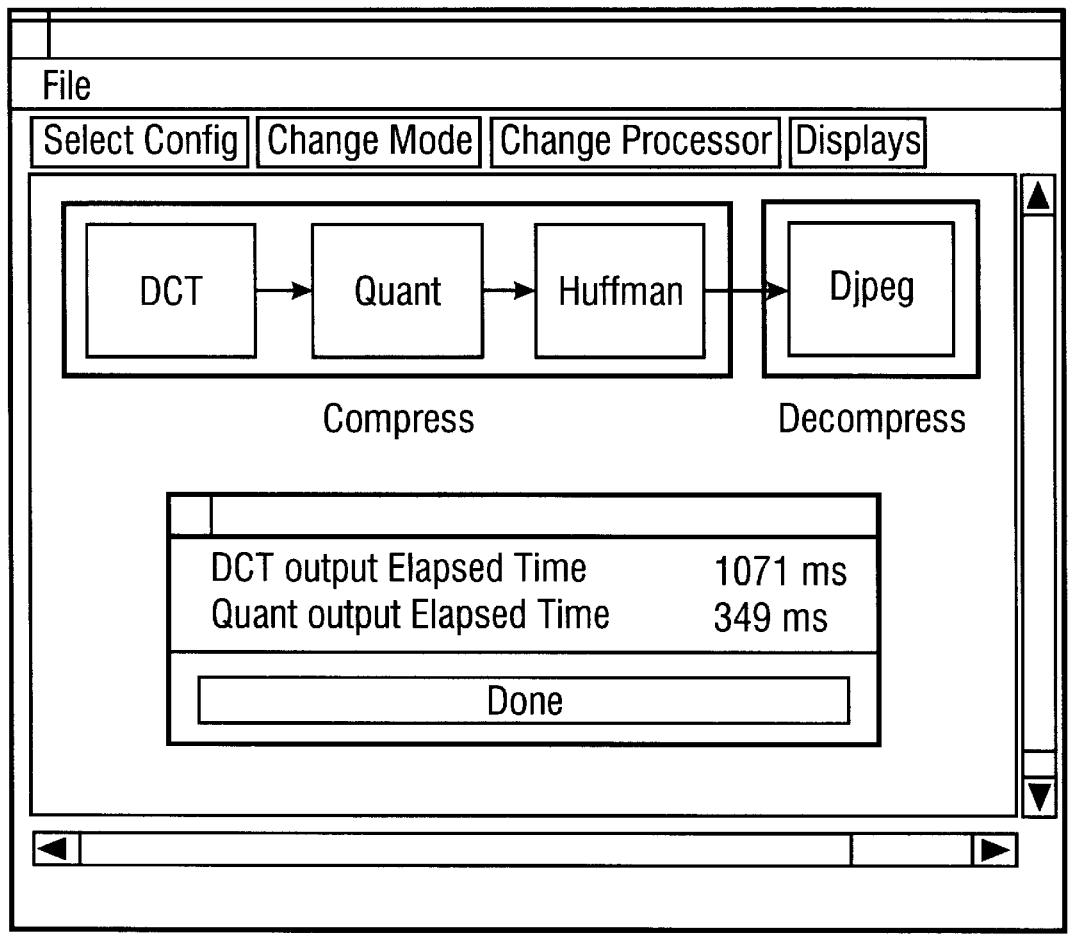
Figure 9:
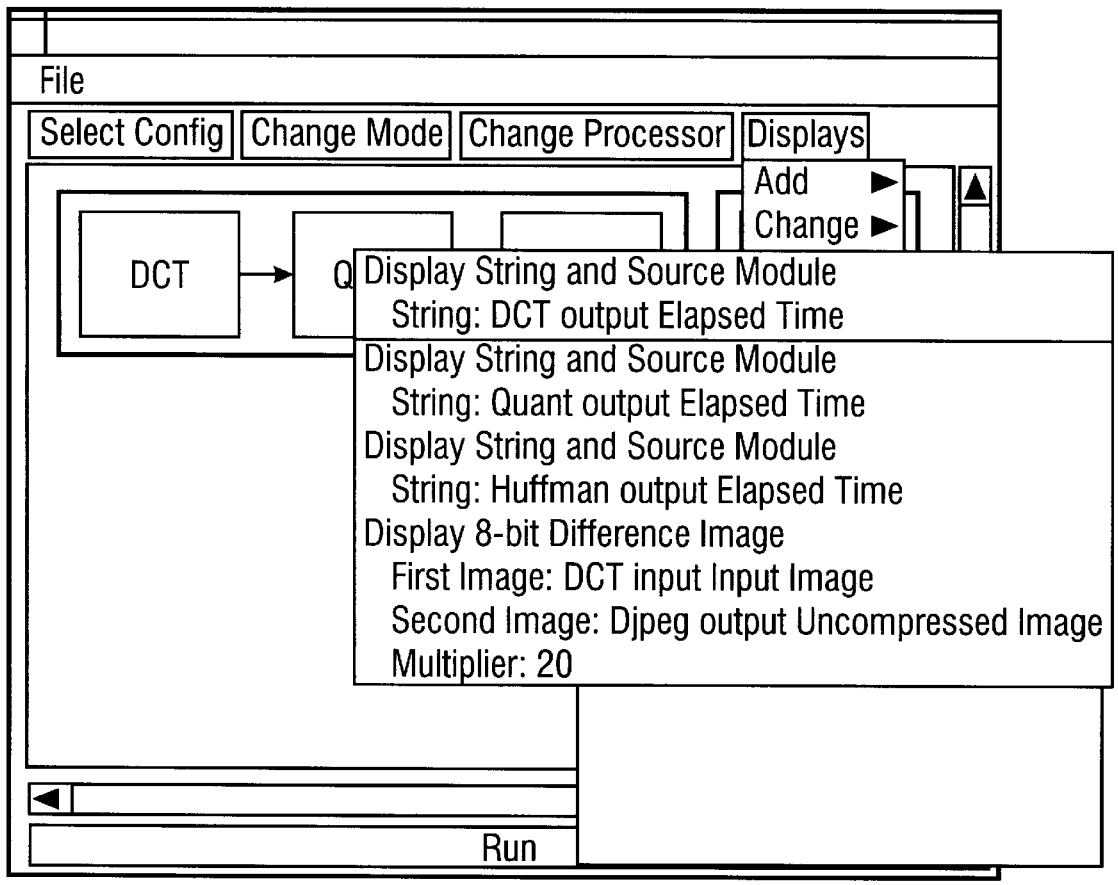
Figure 10:
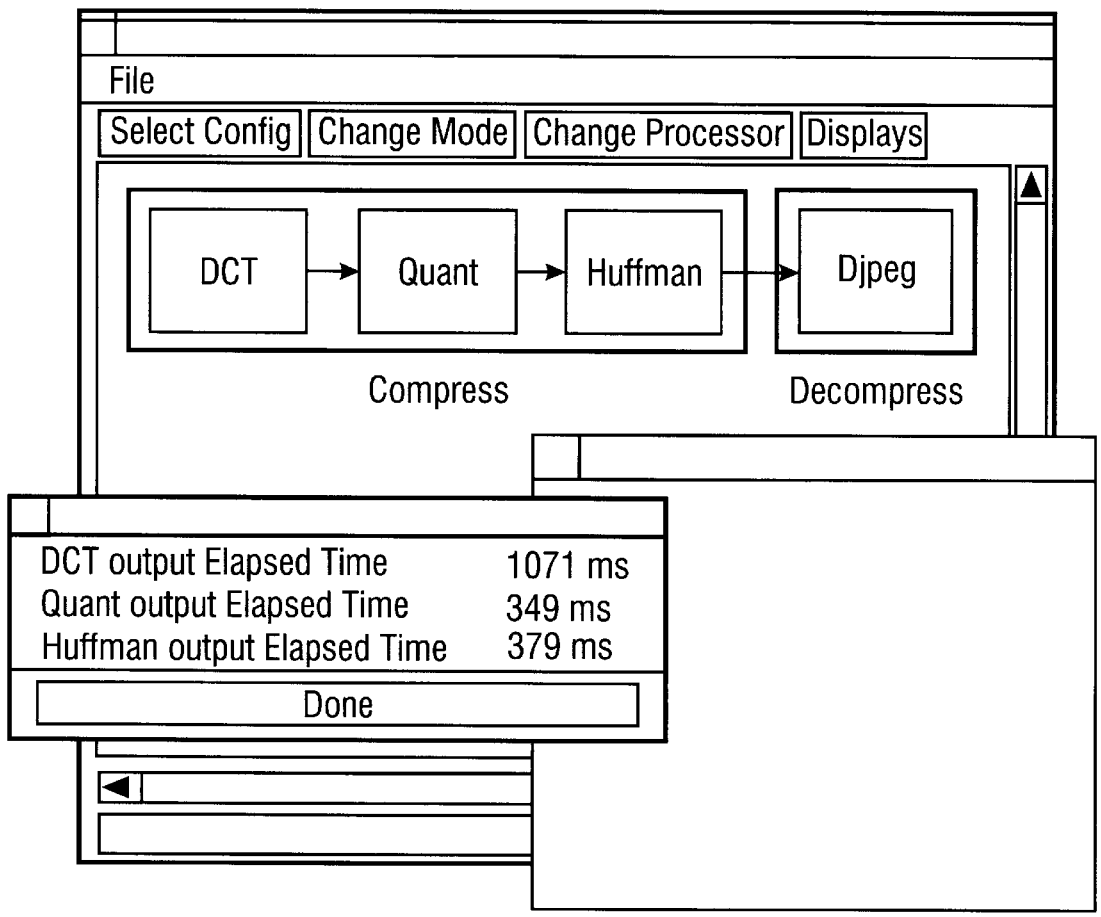

The user clicks on the "Run" menu option at the bottom of the screen when ready to execute the simulation. To indicate the present stage of execution to the user, this embodiment, as shown in FIG. 8, provides an optional feature of highlighting the current processing step as the simulation is executing. This embodiment further provides a "Displays" option in the menu bar to allow users to select optional display features, as shown in FIG. 9. If, for example, a user had selected each of the displayed options in the pop-up window of FIG. 9, this embodiment of the present invention displays a screen such as that shown in FIG. 10.

As suggested by this user perspective, this embodiment allows a user to customize numerous aspects of a particular simulation by, for example, setting the display and selecting configurations, input data, and processors. The user is thus enabled to test a variety of transmission software, even if the software cannot be executed on the user's machine.

One method of executing software on a remote machine, as indicated in the above example, is for the user to specifically select a remote machine by, in this example, clicking on the "Change Processor" menu option. Or, as explained in greater detail below, the present invention may determine that the software must be run on a remote machine without any input from the user.

II. AESOP Software

This embodiment of the present invention is implemented by the AESOP software, which enables the user's machine to access a remote machine, connected to an AESOP server, over a network. The AESOP software recognizes three simple components: (1) machines; (2) modules; and (3) configurations.

A. Machines

To access and execute an application program on a remote machine, the AESOP software must be able to identify its machine type. This embodiment of the present invention identifies a machine type with specific physical hardware, by, for example, architecture, network address and port. A user's machine is defined as:

machine machine-type:local:pathname where machine-type is a user-defined term, generally describing the function of the machine, such as "userio" or "jpeg-proc," and pathname indicates the top-most directory of the AESOP software installation on that machine.

A remote machine is defined as:

machine machine-type:remote-address.port:pathname
where machine-type and pathname are the same terms used for user machines, and remote-address.port is the architecture and connecting network address of the remote machine, with the ".port" information being optional (e.g. sun@george.1903 or sun@george).

As earlier indicated, simulation of data transmission on a remote machine in accordance with the present invention does require that the user have access over a network to that remote machine, and that the remote machine has an AESOP server to run AESOP processes.

2. Modules

A "module," as used herein, represents a block of AESOP code. This embodiment provides three module types: input modules, output modules, and compute modules, each of which is declared as follows:

```
module-type name:label:machine-type:
    arg1-use-type arg1-data-type arg1-name,
    arg2-use-type arg2-data-type arg2-name,
    .
    .
    .
    argN-use-type argN-data-type argN-name
```

In this embodiment, module-type is either "input-module," "output-module," or "compute-module;" name is the term which identifies the module to the AESOP software; label contains the phrase that will be displayed to the user; and machine-type is a machine-type which can run the module.

A list of arguments follows the module header information, which can be input to or output by the module. arg-use-type is either input or output; arg-data-type describes the data type of an argument (e.g., int, char, etc.); and arg-name is the term that identifies the argument to the AESOP software.

1. Input Modules

Input modules are used to access external sources of data such as disk files. In the user perspective described above, FIG. 5 illustrates that various types of input files are available, including those listed in the pop-up window. Each of these file types corresponds to an input module, which is executed to fetch the appropriate type of input data.

An example of an input module is reflected by the "Read .pgm Image File" option provided in the pop-up window of FIG. 5. This input module reads an image stored in a file, whose filename is to be input by a user, and outputs a two-dimensional image to be used by a compute module. In this embodiment, this module is declared as follows:

```
input-module readpgm:Read .pgm Image File:userio:
    input string Filename,
    output char__2d Image
```

2. Output Modules

Output modules are used for displaying information to the user. As an example of an output module for displaying a two-dimensional image, an option listed in the pop-up window of FIG. 7 as "Display 8-bit Image" could be declared as:

```
output-module disp-char-image:Display 8-bit Image:userio:
    input char__2d Image
```

3. Compute Modules

Compute modules are responsible for processing the data. For example, the first compression step in the JPEG transmission simulation described above was "DCT." This step corresponds to a compute module named jpeg_dct, declared as follows in this embodiment:

```
compute-module jpeg-dct:DCT:jpeg-proc:
    input kwd[Local host, TMS320C30, DSP32C, SPARC 10]
        DCT Processor=Local host,
    input char_2d Input-Image,
    output string DCT output Elapsed Time,
    output float_2d DCTs
```

This module is displayed in the GUI as "DCT."Execution of the jpeg-dct function takes as input a keyword for a DCT Processor (assigned, in this case, an initial value of "Local host"), and an input data image, and outputs the string "DCT output Elapsed Time" and a parameter "DCTs"as floating point data.

While each of these module types identifies its input and output and the function it represents, in this implementation, an AESOP module does not itself contain executable code to perform the function. Rather, as explained in greater detail below, the executable code performing the function is invoked through a corresponding "glue function," which is called by the module.

C. Configurations

A configuration represents an application program and includes a sequence of at least one computation module. Input and output modules are not included within configurations because different input and output modules may be used with a single configuration, and the actual input and output modules used in a particular application may not be determined until run time.

For example, in the JPEG example provided above, the pop-up window in FIG. 5 illustrates that a variety of input types are possible, each of which would require a different input module. Accordingly, when a user selects the input type at run time, the AESOP software will provide for the appropriate input module to be executed.

In this embodiment, configurations are declared in the AESOP software as:

config name:label:modulelist where name identifies the configuration to the AESOP software, label is label displayed for the module, and modulelist lists the series of compute modules comprising the configuration. Following this format, the JPEG configuration includes modules for dct, quantization, huffman encoding, and jpeg decompression. Accordingly, the module may be declared as:

```
config jpeg:JPEG:
    jpeg-dct -jpeg-quant, -jpeg-decomp
    jpeg-quant -jpeg-huff, -jpeg-decomp
    jpeg-huff -jpeg-decomp
    jpeg-decomp
```

A module in the modulelist passes its output to each module immediately following, whose name is preceded by a hyphen. An optional feature included in the embodiment shown with reference to FIGS. 3–10 allows users to group modules and provide a more general label for display. The JPEG configuration shown in the drawings, for example, would be declared as follows:

```
config jpeg:JPEG:
    |Compress
        (jpeg-dct -jpeg-quant, -jpeg-decomp
        jpeg-quant -jpeg-huff, -jpeg-decomp
        jpeg-huff -jpeg-decomp)
    |Decompress
        (jpeg-decomp)
``` where "|" precedes the string to be used as the group label.

The AESOP software further provides basic I/O functions which can be called within glue functions to allow data to pass between the AESOP software and the executing code.

This embodiment uses a naming convention of assigning each glue function the name of its corresponding module name, followed by the suffix -glue. For example, the AESOP module named jpeg-dct would have a corresponding glue function named jpeg-dct-glue.

Glue functions for compute modules are called in three contexts in this embodiment: (1) initialization; (2) code execution; and (3) cleanup. Thus, referring back to the example illustrated in the above user perspective with reference to the figures, once the user selects the JPEG configuration, the AESOP software uses the modulelist for the configuration to call the glue function for each module in the modulelist for initialization purposes. This takes care of routine matters such as proper memory allocation.

Once initialization is complete, the glue function is called again to execute the code. In the example showing simulation of the JPEG data transmission, the first module of the configuration, jpeg-dct, is executed by calling the glue function jpeg-dct-glue. Possible code for implementing this function is provided in FIG. 11. (In this example, the functions called within the glue function are defined in the included header files.)

As jpeg-dct-glue executes, it comes to an instruction to get an input 2-d image. As briefly noted and as illustrated in the user perspective provided above, input and output data types are determined at run-time based on user input. In this example, this input data was designated to the AESOP software by user response to the pop-up window asking for input, and the AESOP software applied the appropriate input module.

Each input and output module, like all AESOP modules, has a corresponding glue function for invoking executable code implementing its function, and when an input or output module is called by AESOP, the corresponding glue function is executed.

In this example, once the user selects the input file, the AESOP software executes the glue function for appropriate input modules to fetch the input file for use in the jpeg-dct-glue execution. Execution continues, which, as shown in the code, may involve recursive execution. The output of the jpeg-dct-glue function is passed to the jpeg-quant and jpeg-decomp glue functions.

Once the configuration has been completely executed, this embodiment of AESOP calls each glue function once again for clean up, which entails housekeeping functions such as freeing up allocated memory. In should be noted that the memory allocation and clean up features provided in this embodiment are optional. Accordingly, the present invention may be practiced without either, in which case the glue function need only be called once for execution.

III. Remote Access and Execution

As mentioned above, each module is declared with a machine-type, reflecting any machine dependencies of the code in its corresponding glue function. The present invention permits a single configuration to be comprised of modules having any combination of the user's machine and accessible remote machines.

The ability to execute such configurations illustrates several advantages of the present invention. One advantage is that the present invention enables underlying transmission code to be run in a single application program, avoiding the time consuming process of rewriting code segments to be compatible and executable on one particular machine. Another advantage is that this approach supports parallel processing, which may decrease the processing time of the simulation. Yet another advantage is that users have the enhanced flexibility to designate remote machines to run different modules.

Whether remote machines are accessed only for specific modules of configurations or for complete configurations, the present invention provides three access methods: (1) manual start up; (2) remote start up; and (3) inetd start up (for use in systems such as UNIX). All of these remote execution techniques are generically referred to herein as remote start up.

A. Manual Start Up

Manual start up requires a user at a user machine to log in to the remote machine, outside of the AESOP platform, to start the AESOP server at the remote machine.

B. Remote Start Up

Remote start up allows a user at a user terminal to access remote machines while operating within the AESOP platform. When a configuration is run, the AESOP software in this embodiment calls the glue function for each module of the configuration for initialization. During this period, the modules are scanned to determine whether any remote machine must be accessed. For each such remote machine, AESOP establishes a network connection to the remote machine, prompts the user for login information, logs in, and starts the AESOP server at the remote machine. Then, any input to or output from a module executing on a remote machine can be handled over the network connection between the user machine and the remote machine.

C. Inetd Start Up

The third approach, inetd start up, requires that the remote machine be preconfigured such that when called by AESOP software, it automatically starts its AESOP server. This approach has the same capabilities as the remote start up.

The specific embodiments described herein are provided to illustrate, and not to limit the present invention. Rather, the scope of the invention is defined by the following claims, which encompass other embodiments as well. For example, as indicated above, transmission simulation methods often manipulate the data with procedures other than compression. Various of these procedures, such as noise simulation, may be used without diminishing the advantages of the present invention.

Some types of channels are known to inject specific types of noise into transmitted data. Accordingly, to more closely simulate data transmission over such a channel, a variation of the present invention may estimate noise that would be injected by the channel and use the estimated noise in the data transmission simulation.

Figure 12:
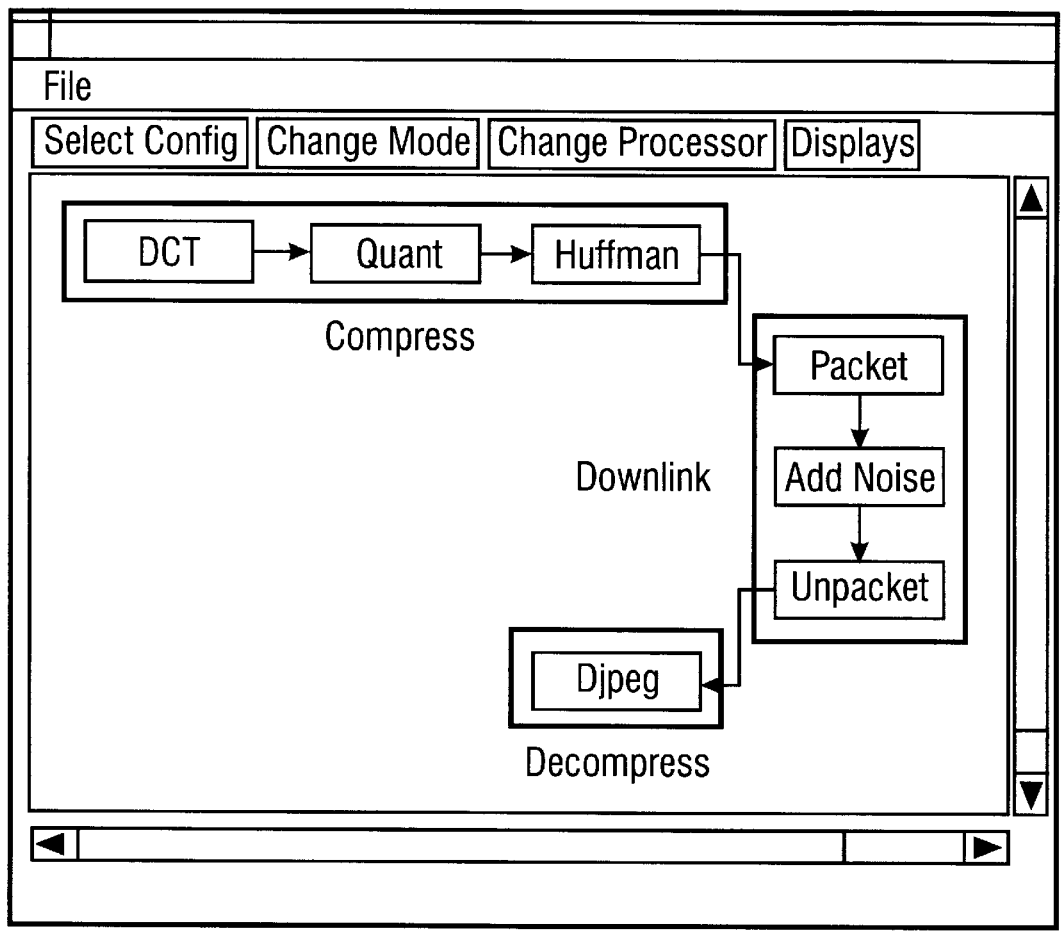
FIG. 12 shows a screen display presented by an embodiment of the present invention providing a flow diagram of a particular configuration including noise simulation.

Numerous techniques to simulate noise can be used in conjunction with the present invention, and can be implemented in a manner similar to the method of remote machine selection. For example, as shown in FIG. 12, one embodiment of the present invention provides a GUI allowing the user to manually select a noise simulation technique to be applied. Or, as an alternative, in a simulation of data transmission over a specific channel, the noise simulation technique corresponding to that type of channel can be determined by the AESOP software. As with the other portions of the code, such as the code applying the compression process, the noise simulation code is executed only within a glue function, and therefore, can be adapted for use by the present invention regardless of whether it is machine-dependent.

Similarly, it should be recognized that the present invention may be practiced with underlying code written in a variety of languages. For example, although the illustrated embodiments present the underlying code in a pseudo-C language, the present invention may also be practiced with underlying code written in languages such as FORTRAN or PV-Wave.

Accordingly, it should be understood that a wide range of changes and modifications can be made to the embodiments described above. It is therefore intended that the foregoing detailed description be illustrative rather than limiting, and that it is the following claims, including all equivalents, which are intended to define the scope of this invention.

What is claimed is:

1. A computer-implemented method for a user machine to simulate a data transmission on a remote machine, comprising:

determining a method for data transmission to be simulated;

determining a remote machine on which to simulate the data transmission;

establishing a connection to the remote machine;

instructing the remote machine to simulate the determined method of data transmission; and receiving results of the simulated data transmission from the remote machine.

2. The method of claim 1, further comprising receiving user input designating a remote machine, wherein determining a remote machine is based on the received user input.

3. The method of claim 1, wherein determining a remote machine is based on the determined method of data transmission.

4. The method of claim 1, further comprising:

determining a channel for which to simulate the data transmission; and determining a noise simulation parameter, based on the determined channel, wherein instructing the remote machine further includes instructing the remote machine to inject noise over the determined channel based on the determined noise simulation parameter for simulating the determined method of data transmission.

5. The method of claim 1, further comprising determining an estimated transmission error rate, based on the simulated data transmission.

6. The method of claim 1, wherein establishing a connection to the remote machine further comprises:

receiving user input for logging in to the remote machine; and starting up the remote machine by logging in to the remote machine in response to the received user input.

7. The method of claim 1, wherein establishing a connection to the remote machine further comprises:

prompting a user for login information;

receiving user input in response to the prompt; and starting up the remote machine by logging in to the remote machine in response to the received user input.

8. The method of claim 1, wherein the remote machine is preconfigured to automatically start up when a connection to the remote machine is established.

9. The method of claim 1, wherein the determined method for data transmission to be simulated is simulated by executing machine-dependent program code on a compatible machine, and wherein the remote machine is compatible with the machine-dependent program code for simulating the determined method for data transmission.

10. The method of claim 9, wherein the user machine is not compatible with the machine-dependent program code for simulating the determined method for data transmission.

11. The method of claim 1, wherein the determined method of data transmission includes data compression.

12. The method of claim 1, wherein the determined method of data transmission includes data encryption.

13. The method of claim 1, wherein determining a method further comprises encapsulating machine-dependent code that simulates the determined method on the remote machine by surrounding the machine dependent code with a machine-independent packet.

14. The method of claim 1, further comprising:

constructing glue functions that invoke executable code for instructing the remote machine.

15. A computer program stored on a machine-readable media comprising instructions for causing a computer to simulate a data transmission on a remote machine;

configure a user machine to determine a method for data transmission to be simulated;

determine a remote machine on which to simulate the data transmission;

establish a connection to the remote machine;

instruct the remote machine to simulate the determined method of data transmission; and receive results of the simulated data transmission from the remote machine.

16. The computer program of claim 15, wherein the determined method for data transmission to be simulated is simulated by executing machine-dependent program code on a compatible machine, and wherein the remote machine is compatible with the machine-dependent program code for simulating the determined method for data transmission.

17. The computer program of claim 16, wherein the user machine is not compatible with the machine-dependent program code for simulating the determined method for data transmission.

18. The computer program of claim 15, wherein the determined method for data transmission includes data compression.

19. The computer program of claim 15, wherein the determined method for data transmission includes data encryption.

20. A computer system for simulating a data transmission, comprising:

a user machine that determines a data transmission method to be simulated, and communicates the determined data transmission method; and a set of remote machines, each connected to the user machine, wherein at least one of the remote machines in the set of remote machines receives the determined data transmission method, and simulates the determined data transmission method and communicates simulation results to the user machine.

21. The computer system of claim 20, wherein a remote machine receiving communication from the user machine is designated by user input.

22. The computer system of claim 20, wherein a remote machine receiving communication from the user machine is determined based on the determined method of data transmission.

23. The computer system of claim 20, wherein each remote machine receiving communication from the user machine determines an estimated transmission error rate based on the simulated data transmission, and communicates the estimated transmission error rate with the simulation results to the user machine.

24. The computer system of claim 20, wherein:

the data transmission method to be simulated includes at least two steps and the set of remote machines includes at least two remote machines, the user machine communicates at least a first step of the data transmission method to a first remote machine and communicates at least a second step of the data transmission method to a second remote machine, the first remote machine simulates the first step, and the second remote machine simulates the second step.

25. The computer system of claim 20, wherein the determined data transmission method to be simulated is simulated by executing machine-dependent program code on a compatible machine, and wherein each of the set of remote machines simulating the determined data transmission method is compatible with the machine-dependent program code for simulating the determined data transmission method.

26. The computer system of claim 25, wherein the user machine is not compatible with the machine-dependent program code for simulating the determined data transmission method.

27. The computer system of claim 20, wherein the determined data transmission method includes data compression.

28. The computer system of claim 20, wherein the determined data transmission method includes data encryption.

* * * * *